United States Patent [19]
Green et al.

[11] Patent Number: 4,643,465
[45] Date of Patent: Feb. 17, 1987

[54] PIPE COUPLING

[75] Inventors: Terry D. Green, Lowman; Kenneth C. Kao, Horseheads; Robert J. O'Loughlin, Jr.; Robert C. Reese, both of Corning, all of N.Y.

[73] Assignee: Corning Glass Works, Corning, N.Y.

[21] Appl. No.: 768,845

[22] Filed: Aug. 23, 1985

[51] Int. Cl.⁴ ............................................ F16L 21/06
[52] U.S. Cl. .................................. 285/236; 285/420; 285/908; 285/911; 285/369
[58] Field of Search ......... 285/236, 235, 373, DIG. 9, 285/DIG. 12, 369, 417, 420

[56] References Cited

U.S. PATENT DOCUMENTS

| | | | |
|---|---|---|---|
| 3,084,959 | 4/1963 | Stanton | 285/233 |
| 3,233,907 | 2/1966 | Stanton | 277/101 |
| 3,376,055 | 4/1968 | Donroe | 285/236 |
| 3,419,291 | 12/1968 | Tomb et al. | 285/233 |
| 3,527,484 | 9/1970 | Walkden | 285/236 |
| 3,565,468 | 2/1971 | Garrett | 285/373 |
| 3,572,773 | 3/1971 | Read | 285/236 |
| 3,630,550 | 12/1971 | Zine, Jr. | 285/235 |
| 3,633,947 | 1/1972 | Nelson | 285/233 |
| 3,718,351 | 2/1973 | Bakkerus | 285/373 |
| 3,743,329 | 7/1973 | Wesel, Sr. | 285/236 |
| 3,836,182 | 9/1974 | Miller | 285/369 |
| 3,907,341 | 9/1975 | Schoepe | 285/236 |
| 4,026,586 | 5/1977 | Kennedy, Jr. et al. | 285/236 |
| 4,155,574 | 5/1979 | Hulsey | 285/236 |
| 4,426,106 | 1/1984 | McCoy | 285/236 |
| 4,538,835 | 9/1985 | Ledgerwood | 285/236 |

Primary Examiner—Cornelius J. Husar
Assistant Examiner—Eric M. Nicholson
Attorney, Agent, or Firm—B. R. Turner

[57] ABSTRACT

A coupling is set forth for joining a beaded end and a plain end glass pipe together, wherein an outer clamping band retains an elastomeric sleeve therewithin and inhibits the longitudinal flow thereof by means of openings and projections formed in the outer periphery of the band, and said elastomeric sleeve is provided with varying diameters and recesses for providing unequal force distribution across the coupling while limiting the longitudinal expansion of the elastomeric sleeve.

2 Claims, 6 Drawing Figures

PIPE COUPLING

BACKGROUND OF THE INVENTION

The field to which this invention pertains is that of pipe couplings in fluid handling systems, and more particularly couplings having utility in joining an unbeaded or plain cylindrical glass pipe end portion to a beaded glass pipe end portion. The prior art is replete with pipe couplings for joining glass pipes together having both beaded and unbeaded end portions.

U.S. Pat. No. 3,084,959, to Stanton, discloses a pipe coupling having a gasket formed of either triangular or circular regions which are joined together by web sections, and held within a clamp having opposed inclined angles. Accordingly, as the clamp is being tightened about the gasket, the applied lines of force to the end regions of the gasket are directed toward the pipe ends, and tend to shorten the gasket as it is compressed about the pipe. In a like manner, U.S. Pat. No. 3,233,907 to Stanton discloses a coupling for joining pipe sections of different diameters, wherein a gasket member has a central indentation to facilitate the bending of an edge of the gasket around a bead portion of the pipe, as an outer clamp having a tapered wall is tightened about the pipe.

Tomb et al. U.S. Pat. No. 3,419,291 relates to a pipe coupling for joining unbeaded cylindrical sections of glass pipe, wherein an annular bead-like adaptor member is held around the end of an unbeaded cylindrical section of glass pipe by means of a metal band, which is bonded to the outer surface of the pipe and interlocks with the adapter member.

The Walkden U.S. Pat. No. 3,527,484 relates to a pipe coupling for joining the plain unbeaded ends of glass pipes which includes a deformable sealing gasket positioned between the abutting ends of the pipes, an elastomeric sleeve placed exteriorly around the sealing gasket, a coating of high friction material placed between the pipe and the internal surface of the elastomeric sleeve where the sleeve extends beyond the ends of the sealing gasket, and an external clamping ring having radially-inwardly extending edge portions which restrict axial expansion of the sleeve.

The Read U.S. Pat. No. 3,572,773 relates to a pipe coupling adapted for coupling the ends of two axially aligned glass pipes, embodying a tubular sealing gasket positioned over the exterior end portions of the pipes, an elastomeric sleeve placed exteriorly over the gasket to contact the gasket and the pipes, and a metallic band having tapered sidewalls positioned around the sleeve for clamping the sleeve and the gasket tightly to the end portions of the pipes while restricting axial expansion of the sleeve.

The Zine U.S. Pat. No. 3,630,550 relates to a coupling for joining a plain cylindrical and a beaded pipe end portion, which includes a resilient liner surrounded by a force-generating clamping band for each pipe end. Each clamping band has a tapered surface which axially compresses the resilient liner to prevent axial elongation thereof during the tightening of the bands.

The Nelson U.S. Pat. No. 3,633,947 relates to a coupling for joining two pipe end sections, wherein the coupling includes a resilient liner and a one-piece and having stepped interlocking and overlapping end sections. The band has tapered sidewalls cooperating with tapered sidewalls of the resilient liner for compressing the same and inhibiting axial elongation of the liner.

The Wesel U.S. Pat. No. 3,743,329 relates to a coupling for joining a plain unbeaded end and a beaded end of glass pipes, including an annular resilient liner and a clamping member. The resilient liner is provided with a load-dividing groove and pressure intensifying ridges, while the clamping member is provided with frustoconical surfaces for preventing the extrusion or expansion of the liner in an axial direction.

The present invention materially reduces the problems encountered with known couplings by providing an elastomeric sleeve having differential outer diameters and thicknesses for equalizing or predetermining the amount of compression exerted on the various pipe ends, isolation troughs for isolating segments of the elastomeric sleeve in order to create distinctive pressure zones, and a compression clamp having means formed in its outer wall for limiting the expansion of the sleeve along the axis of the pipe.

SUMMARY OF THE INVENTION

In its simplest form, the present invention sets forth a new concept in providing a coupling for joining a beaded end glass pipe and an axially aligned plain end glass pipe together. The coupling includes an elastomeric sleeve, which not only incorporates varying diameters to provide for a desired holding force on various portions of the coupled pipe ends, but also includes trough or recessed portions for isolating various segments of the elastomeric sleeve in order to create distinctive pressure zones, and for limiting the expansion of the elastomeric sleeve along the axis of the axially aligned pipes. The coupling also includes a tightening band or clamp having means formed in its outer surface for restraining the axial flow of the resilient elastomeric sleeve, so as to restrain the longitudinal or axial flow of elastomer along the pipe as the clamp is tightened thereon. Further, the sealing of the coupling is enhanced through the use of sealing ridges which magnify the pressure exerted by the clamp about desired annular portions.

It thus has been an object of the present invention to obviate the problems heretofore encountered in previous pipe couplings by providing an overall improved coupling which does not require tapered sidewalls on the clamping band to restrain the elastomeric sleeve from axial expansion during the tightening of the band.

DESCRIPTION OF THE PREFERRED EMBODIMENTS

Figure 1:
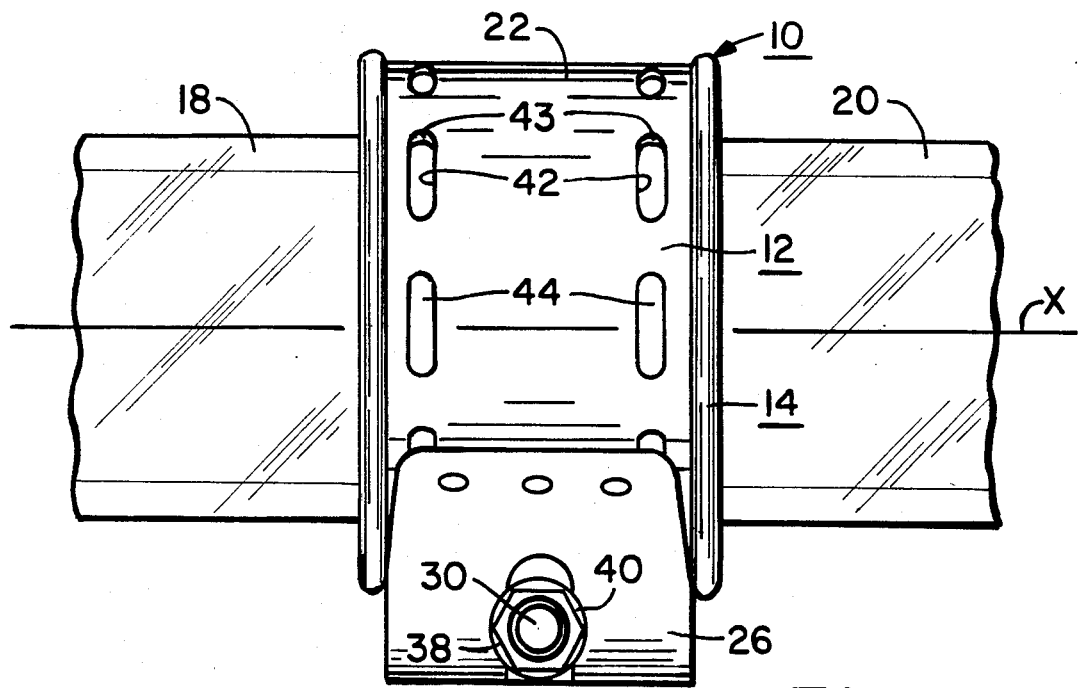
FIG. 1 is a plan or elevational view, depending upon the orientation of the pipes, of a pipe coupling embodying the present invention, in a tightened state exerting compression on the coupled pipes.
Figure 2:
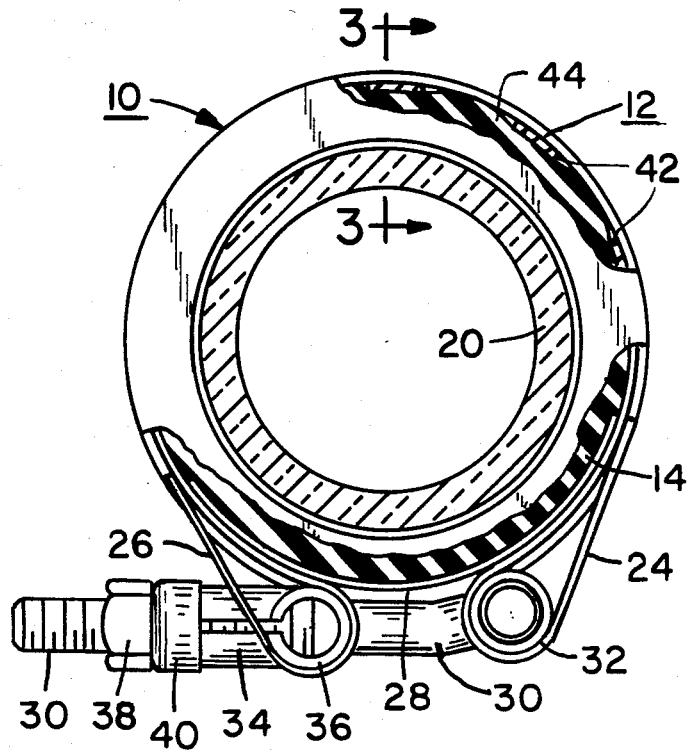
FIG. 2 is an elevational view, partially in section, showing the coupling of FIG. 1.
Figure 3:
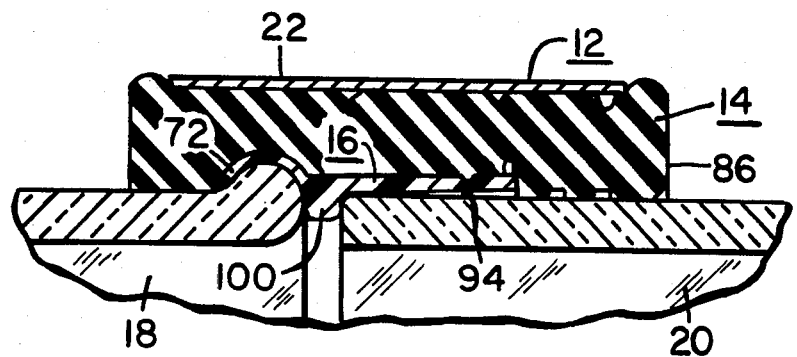
FIG. 3 is an enlarged fragmental elevational view in section taken along line 3—3 of FIG. 2.

Referring now to the drawings, and particularly FIGS. 1, 2 and 3, a coupling 10, comprising an outer shell or clamping band 12, a resilient elastomeric sleeve 14 and a liner 16, is shown coupling the end portions of a beaded glass pipe 18 and an axially aligned plain-ended glass pipe 20. The outer shell 12 includes an outer band portion 22 having rolled-back or looped wing ends 24, 26 and a connector portion 28 extending between the wing ends. A threaded stem 30, having a T-shaped base portion 32, is pivotally mounted within the looped end portion 24, and extends through a guide member 34 having a T-shaped base portion 36 pivotally mounted within the looped end 26. A tightening nut 38 engages a capped end portion 40 of the guide 34 for tightening the outer band portion 22 about the elastomeric sleeve 14. As the outer shell is tightened, the connector portion 28, which may be welded to the looped end portion 24, slides along the inner surface of looped end portion 26 and cooperates with the remainder of the band portion 22 to compress the resilient sleeve 14 above the pipes 18, 20.

The outer band portion 22 of the shell 12 is provided with means for inhibiting the elongation of the elastomeric sleeve 14 along the longitudinal axis of the axially aligned pipes 18 and 20 as the band is tightened. Thus, by limiting the longitudinal expansion of the elastomer, greater radial force is exerted thereby for sealably clamping the pipes together. Although various means may be utilized to restrain the longitudinal flow of the elastomer, a preferred means includes a plurality of openings or perforations 42, as shown in the outer band portion 22 of the outer shell 12. As the band is tightened, portions 44 of the resilient elastomeric sleeve 14 are distorted into the openings 42 in the shell 12, to thereby prevent or inhibit the elongation of the elastomer along the axis of the pipes.

In addition to the use of openings or perforations 44, the shell 12 may be stamped or provided with offsets or protrusions 43 which extend inwardly of the shell. The tabs or inwardly projecting excess metal, present as a result of the stamping or perforation formation, physically retain the sleeve and prevent the longitudinal expansion thereof during the tightening of the clamp. Further, retention of the elastomer within the shell may be enhanced by increasing the coefficient of friction between the elastomer and the metal shell, such as by roughing the internal metal surface of the shell through sandblasting, waffling, grooving, knurling or the like. In addition, if desired, friction enhancing materials such as sand, grit, or trackifying agents may be utilized, or even adhesives, to help retain the elastomer within the longitudinal confines of the shell and prevent elongation thereof along the axis X of the pipes. Although such friction enhancing techniques provide alternate means for restraining the longitudinal movement of the sleeve, the use of stamped perforations and/or protrusions, which may take any desired shape, is preferred.

As noted in FIGS. 1 and 3, a linear portion of the longitudinal extent of the outer periphery (side upon which the numeral 12 is directed) of the preferred clamping band 22 lies wholly within a first plane extending parallel to the axis of the longitudinally aligned pipes. Also, a linear portion of the inner periphery (side opposite to which the numeral 12 is directed) of the clamping band 22 lies wholly within a second plane which is parallel to the first plane. Further, as noted particularly in FIG. 3, the cross-section of the clamping band lying within a plane passing through and containing the pipe axis, has parallel inner and outer peripherial surfaces which also lie wholly within, and terminates in, parallel planes lying parallel to the axis of the pipes. The band does not include tapered sidewall portions lying in planes which intersect the pipe axis, for restraining the longitudinal flow of the elastomeric sleeve, as was required in the prior art couplings. That is, the use of the perforations 42 or protrusions 43 within the outer band 22 of the clamp 12 effectively restrains the elastomeric sleeve from flowing longitudinally along the axis of the connected pipes during the tightening of the clamp. Accordingly, the force generated during the tightening of the band is primarily radially of the pipes so as to produce an effective gripping and sealing of the pipes as they are coupled together.

Figure 4:
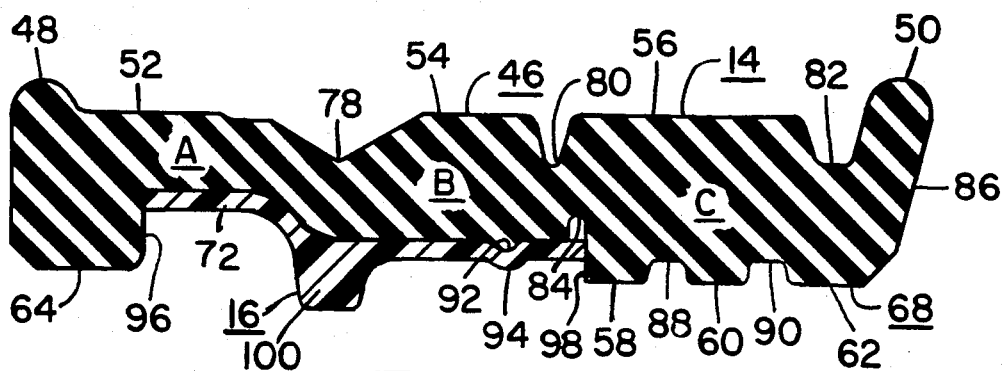
FIG. 4 is an enlarged cross-sectional view of the sleeve and liner of the present invention in a relaxed state.
Figure 5:
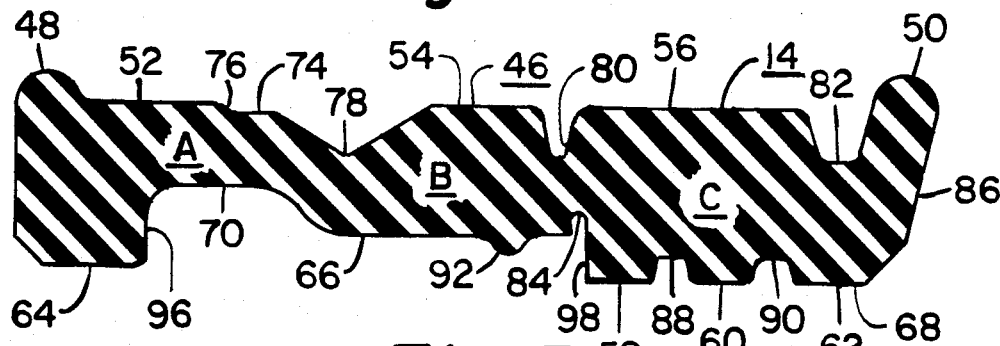
FIG. 5 is a cross-sectional view similar to FIG. 4, but of the sleeve alone.
Figure 6:
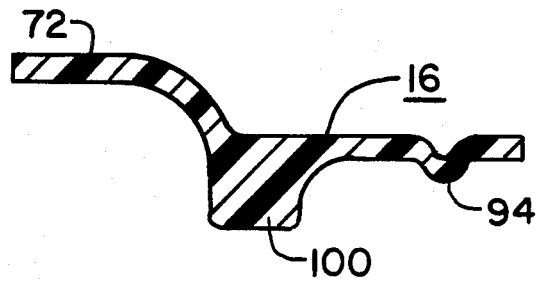
FIG. 6 is a cross-sectional view similar to FIG. 4, but of the liner alone.

Referring now to the elastomeric sleeve 14 as shown in its relaxed state in FIGS. 4 and 5, the outer peripheral surface 46 terminates at its longitudinal ends in a pair of retention rims 48, 50 for retaining and aligning the sleeve within the outer shell 12, particularly when manipulating the coupling prior to being tightened upon a pair of pipe members. As noted particularly in FIG. 5, outer peripheral surface portions 52, 54 and 56 all lie in the same plane, and according are contacted simultaneously by the clamping band 12 as it is tightened upon the sleeve 14. However, the radial thickness of the sleeve 14 between outer surface portion 56 and inner surface portions 58, 60 and 62 is greater than the radial thickness between outer surface portion 52 and inner surface portion 64. Thus, when the sleeve is positioned upon the ends of pipes 18 and 20, surface portions 58, 60 and 62 are in engagement with the outer surface of pipe 20, whereas inner surface portion 64 is spaced apart from the outer surface of pipe 18. Accordingly, when the clamping band 12 is initially tightened about the sleeve 14, the varying thicknesses between the inner and outer diameters function to create more force on the plain end pipe 20 by compressing the elastomer diametrically on the plain end pipe a greater distance than the elastomer on beaded end pipe 18. Accordingly, a greater percentage of the total clamping force generated by the tightening of clamping band 12 is used to hold the plain end pipe 20 in position, whereas less force is required to retain the beaded end pipe 18.

The liner 16 is positioned within a cavity 66 formed in the inner peripheral surface 68 of the sleeve 14. A recess 70 is formed within the cavity 66 for receiving wing portion 72 of the liner 16, and the beaded portion of pipe 18 therewithin. Outer surface portion 52 has an offset surface portion 74, of lesser diameter than the surface portion 52, which is connected to surface portion 52 by a tapered surface 76. The tapered surface 76 is positioned radially outwardly of the beaded end of pipe 18, and the bead functions as a fulcrum such that surface 52 pivots around the pipe bead as the clamp 12 is tightened against surface 52, since surface 64 is not initially in contact with the outer surface of pipe 18. As the clamp 12 is tightened, it contacts surface 52, bending the body of the sleeve about the fulcrum of the beaded end, positioned below tapered surface 76, with the recess 70 and wing 72 conforming to the outer surface of the beaded end of pipe 18 until surface 64 snuggly engages the outer surface of pipe 18. The stepped or offset surface portion 74 allows the tightening of the clamp 12 to preload the plain ended pipe 20 before the clamping force is applied to the bead of pipe 18.

Thus, by varying the diameters of the inner and outer peripheral surfaces to provide difference thicknesses within the sleeve member, a desired unequal force distribution across the clamp is obtainable so as to provide a unique coupling which securely clamps and couples the plain ended pipe portion without applying undue stress to the beaded end pipe portion. In other words, the difference in the outside diameters and thickness portions of the sleeve create desired forces on the bead of the beaded glass pipe and on the surface of the plain end pipe by defining the compression applied on each segment of the elastomeric sleeve when the clamp is tightened to its final position.

The outer peripheral surface 46 is provided with a V-shaped recess 78 and two U-shaped recesses 80, 82, whereas the inner peripheral surface 68 is provided with a U-shaped recess 84 which is cooperably opposed to a portion of the recess 80. The recesses 78, 80, 82 and 84 function to provide three expansion sections A, B and C of the elastomeric sleeve along the axis of the pipes, thereby reducing the amount of material that can be deformed in each section so as to localize the expansion of the sleeve. If the recesses were not provided, the sleeve would have an expansive elongation which would tend to produce misalignment of the sleeve and the liner and misalignment of the bead within the liner. In addition, the cooperably opposed recesses 80, 84 function to isolate designated sections B, C of the elastomeric sleeve 14 in order to create distinctive pressure zones for sealing and gripping the plain ended pipe 20.

The tapered sidewall 86 compensates for the expansion of the sleeve during the tightening of the band so as to provide a more uniform aesthetic sidewall appearance as shown in FIG. 3. Recesses 88 and 90, formed in the inner peripheral surface 68, form inner surface portions 58 and 60 into pressure ridges. In other words, as a force is applied by the clamping band to the expanse of outer surface portion 56, the unit force exerted upon the pipe 20 by pressure ridges 58 and 60 is greatly increased from that applied to surface 56, and such pressure is localized along the pressure ridges for holding the pipe 20 in place. In a like manner, a pressure ridge 92 is formed in the cavity wall 66 for cooperating with a back portion of a sealing ridge 94 formed in the liner 16. The pressure ridge 92 localizes virtually all of the pressure applied by the clamp to outer surface portion 54, at a rim portion of the ridge 92 to create a seal between the sealing ridge 94 of the liner 16 and the glass pipe 20.

The end walls 96, 98 of the cavity 66 function as locating surfaces for the ends of liner 16 within the sleeve 14, so as to position and retain the liner in correct orientation within the cavity 66 of the sleeve. As previously mentioned, recess 70 formed within the cavity 66 receives the wing portion 72 of the liner 16, which in turn cooperatively receives and seals the beaded end portion of the pipe 18.

The liner 16 is made of fluorocarbon plastic, a preferably tetrafluoroethylene (TFE) material, so as to not only be substantially inert to fluids within the pipes 18 and 20, but also to provide effective seals with the coupled pipes adjacent the wing 72 and sealing ridge 94. The liner 16 is provided with an inwardly projecting ridge 100 which functions as a pipe divider to separate the end portions of the adjacent coupled pipes 18 and 20. As previously mentioned, the sealing ridge 94 increases the sealing effectiveness between the liner and the glass surface of pipe 20 by creating a localized pressure ring at the interface of the outer periphery of the glass pipe and the inner periphery of the sealing ridge.

In order to increase the coefficient of friction between the sleeve 14 and the plain ended pipe 20, inner surface portions 58, 60 and 62 may be provided with a suitable coating such as a heat or solvent softenable adhesive. One such adhesive which provides excellent results is a cyanoacrylate sold under the trademark Loctite Superbonder 498.

Although the now preferred embodiments of the invention have been disclosed, it will be apparent to those skilled in the art that various changes and modifications may be made thereto without departing from the spirit and scope of the invention as defined in the appended claims.

We claim:

1. A pipe coupling for joining a beaded end glass pipe and a plain end glass pipe in alignment along a common axis comprising:
   a single outer metallic clamping band;
   a resilient elastomeric sleeve member positioned within said outer clamping band;
   a chemically resistant liner positioned within said elastomeric sleeve for positioning receiving end portions of coupled pipes;
   said metal band having outer and inner linear peripheral portions which lie wholly within and terminate within parallel planes extending parallel to the axis of the coupled pipes;
   said band having perforation means extending therethrough for receiving portions of said elastomeric sleeve thereabout as the band is tightened thereabout and for inhibiting longitudinal elongation of the band along the axis of the pipes;
   said elastomeric sleeve having rim portions which extend both radially and axially outwardly of said clamping band;
   said elastomeric sleeve having unequal force distribution means in the form of varying diametrical thicknesses along its extent over the plain end pipe for creating greater force on the plain end pipe than on the beaded end pipe upon the tightening of the clamping band;
   said liner being positionably retained within a cavity formed in an inner periphery of said sleeve member;
   said sleeve member having a plurality of internal pressure ridges adjacent the plain end pipe;
   and said pressure ridges having an adhesive coating thereon for increasing the coefficient of friction of the surfaces of said pressure ridges.

2. A coupling for joining end portions of a pair of glass pipes together in axial alignment wherein one pipe has a beaded end and the other pipe has a plain end;
   said coupling comprising a single metal outer clamping band, an elastomeric sleeve member positioned within said outer clamping band, and a liner for protecting said elastomeric material positionably retained by said sleeve member adjacent the ends of said coupled pipes;
   a cross-section of said metal outer clamping band which lies within a plane passing through and containing the axis of the axially aligned pipes, has parallel inner and outer linear peripheral surfaces which lie wholly within and terminate in parallel planes lying parallel to the axis of said pipes;

said metal outer clamping band having means for restraining the longitudinal flow of the elastomeric sleeve member along the pipe axis as the clamping band is tightened about the sleeve member;

said restraining means including a plurality of perforations extending through the outer periphery of said metal band which receive portions of the elastomeric sleeve therewithin upon the tightening of the band about the sleeve;

said sleve member including means for providing unequal force distribution to the coupled pipes along the longitudinal extent of said clamping band;

said unequal force distribution means including varying diametrical thicknesses along various designated segments of the longitudinal extent of said sleeve for creating more force generated by said band on said plain end pipe than said beaded end pipe to securely couple the same together as the clamping band is tightened;

said sleeve member being formed of an elastomeric material, and including means for limiting the expansion of the elastomeric sleeve along the axis of the coupled pipes;

said limiting means including a plurality of recesses formed in inner and outer peripheral surfaces of said sleeve for reducing the amount of material that can be deformed axially during the tightening of the clamping band;

said sleeve member having means for isolating segments thereof and for creating distinctive pressure zones along its longitudinal extent;

and said sleeve member having means for positionably retaining said liner.

* * * * *